United States Patent [19]
Soref

[11] 4,355,864
[45] Oct. 26, 1982

[54] MAGNETOOPTIC SWITCHING DEVICES

[75] Inventor: Richard A. Soref, Newton Centre, Mass.

[73] Assignee: Sperry Corporation, New York, N.Y.

[21] Appl. No.: 134,048

[22] Filed: Mar. 26, 1980

[51] Int. Cl.³ .......................... G02B 5/172; G02F 1/01
[52] U.S. Cl. ................ 350/96.18; 350/96.19; 350/355; 350/375
[58] Field of Search .............. 350/96.13, 96.14, 96.15, 350/96.16, 96.18, 96.19, 162 R, 355, 359, 360, 375

[56] References Cited

U.S. PATENT DOCUMENTS

| | | | |
|---|---|---|---|
| 3,752,563 | 8/1973 | Torok et al. | 350/375 |
| 3,894,789 | 7/1975 | Kobayashi et al. | 350/96.18 |
| 4,082,424 | 4/1978 | Sauter et al. | 350/96.11 |
| 4,111,524 | 9/1978 | Tomlinson | 350/96.19 |
| 4,119,362 | 10/1978 | Holzman | 350/96.18 |
| 4,148,556 | 4/1979 | Sauter et al. | 350/96.13 |
| 4,168,107 | 9/1979 | Sauter | 350/96.13 |
| 4,198,117 | 4/1980 | Kobayashi | 350/96.19 |
| 4,208,094 | 6/1980 | Tomlinson et al. | 350/96.19 X |

FOREIGN PATENT DOCUMENTS

| | | | |
|---|---|---|---|
| 54-100752 | 8/1979 | Japan | 350/96.18 |
| 54-102136 | 8/1979 | Japan | 350/96.18 |
| 7714270 | 6/1979 | Netherlands | 350/96.18 |

OTHER PUBLICATIONS

Johansen et al, "Variation of Stripe-Domain Spacing in . . .", *J. Applied Physics*, vol. 42, No. 4, Mar. 1971, pp. 1715-1716.

Cohen et al, "Microlenses for Coupling Junction Lasers to Optical Fibers," *Applied Optics*, vol. 13, No. 1, Jan. 1974, pp. 89-94.

*Primary Examiner*—John D. Lee
*Attorney, Agent, or Firm*—Howard P. Terry

[57] ABSTRACT

Magnetooptical switches for application in optical communication and data processing systems for switching, multiplexing, and demultiplexing take improved compact forms for switching unpolarized optical signals from one multimode fiber guide to selected ones of a plurality of such fiber guides. Reflection and transmission switches are provided, as well as devices for simultaneous switching of both upstream and downstream light waves.

22 Claims, 11 Drawing Figures

MAGNETOOPTIC SWITCHING DEVICES

BACKGROUND OF THE INVENTION

1. Field of the Invention

The invention described herein relates generally to magnetooptical switches with application in optical communication and data processing systems for switching, multiplexing, and demultiplexing optical data and more particularly concerns compact magnetooptical devices for providing rapid and reliable switching of unpolarized optical signals from one multimode optical fiber guide to any one of a plurality of multimode fiber guides.

2. Description of the Prior Art

In the prior art, miniature devices are known that permit the transfer of optical power from a thin film structure to associated fiber transmission lines. In the U.S. Pat. No. 4,082,424 for an "Integrated Optic Device" in the names of G. F. Sauter and G. F. Nelson, issued Apr. 4, 1978 and assigned to Sperry Corporation, there is disclosed an integrated optical device including a diffraction grating construction consisting of a stripe domain garnet film in intimate contact with a suitable wave guide, both supported by a suitable substrate. A light beam directed incident to the surface of the stripe domain garnet film is selectively and varyingly coupled to the wave guide and is selectively and varyingly directed along the plane of the wave guide to a selected one of a plurality of output couplers for retransmission to an associated optical fiber transmission line. The magnetic film stripe domain diffraction grating and the method of the operation thereof of the E. J. Torok, D. S. Lo, and David I. Norman U.S. Pat. No. 3,752,563, issued Aug. 14, 1973 for "Magnetic Film Stripe Domain Diffraction", also assigned to Sperry Corporation are used as the means for coupling, switching, modulating, and multiplexing the light beam to and within the optical wave guide for subsequent processing of data borne by the light beam. In this apparatus, the light beam is limited to use with a single mode, single frequency light beam.

In the U.S. Pat. No. 4,168,107 to G. F. Sauter for a "Multimode Optic Device", issued Sept. 18, 1979 and assigned to Sperry Corporation, there is disclosed an improvement over such prior art in that the invention may use a multimode, multifrequency light beam for signal transmission whereby the design limitations of the apparatus are substantially reduced, resulting in a simplified optical switch or multiplexer of data-modulated light beams. The Sauter invention relates to an optical device using a diffraction grating as a means for switching, multiplexing, or demultiplexing a data-modulated multimode, multifrequency light beam. The diffraction grating consists of stripe domains established in a garnet film. A multimode, multifrequency data modulated light beam is directed normally incident to the first surface of the garnet film by an input optical fiber. By suitable magnetic fields in the plane of the garnet film, the stripe domain orientation is rotated. The rotated stripe domains, in turn, selectively and varyingly couple the first order diffracted light beam to selected first pairs of first order output optical fiber guides coupled to the second surface of the garnet film in a conical array. Reference may be had also to the technical paper by T. R. Johansen, D. I. Norman, and E. J. Torok, entitled: "Variation of Stripe-Domain Spacing in a Faraday Effect Light Deflector", *Journal of Applied Physics*, Vol. 42, No. 4, page 1715, Mar. 15, 1971 and to the G. F. Sauter, R. W. Honebrink U.S. Pat. No. 4,148,556 for a "Multimode Optical Device", issued Apr. 10, 1979 and assigned to Sperry Corporation.

SUMMARY OF THE INVENTION

According to the present invention, a magnetic field-controlled variable optical grating is generated within a film of magnetooptically sensitive material, such as garnet, for employment as a primary element in switching unpolarized optical signals from one multimode, multifrequency optical fiber guide to any one of a plurality of multimode guides with low insertion loss, low cross talk, and low excess loss. Reflection and transmission switches are provided, as well as devices providing simultaneous bilateral switching of both upstream and downstream signal propagation.

DESCRIPTION OF THE PREFERRED EMBODIMENTS

Figure 1:
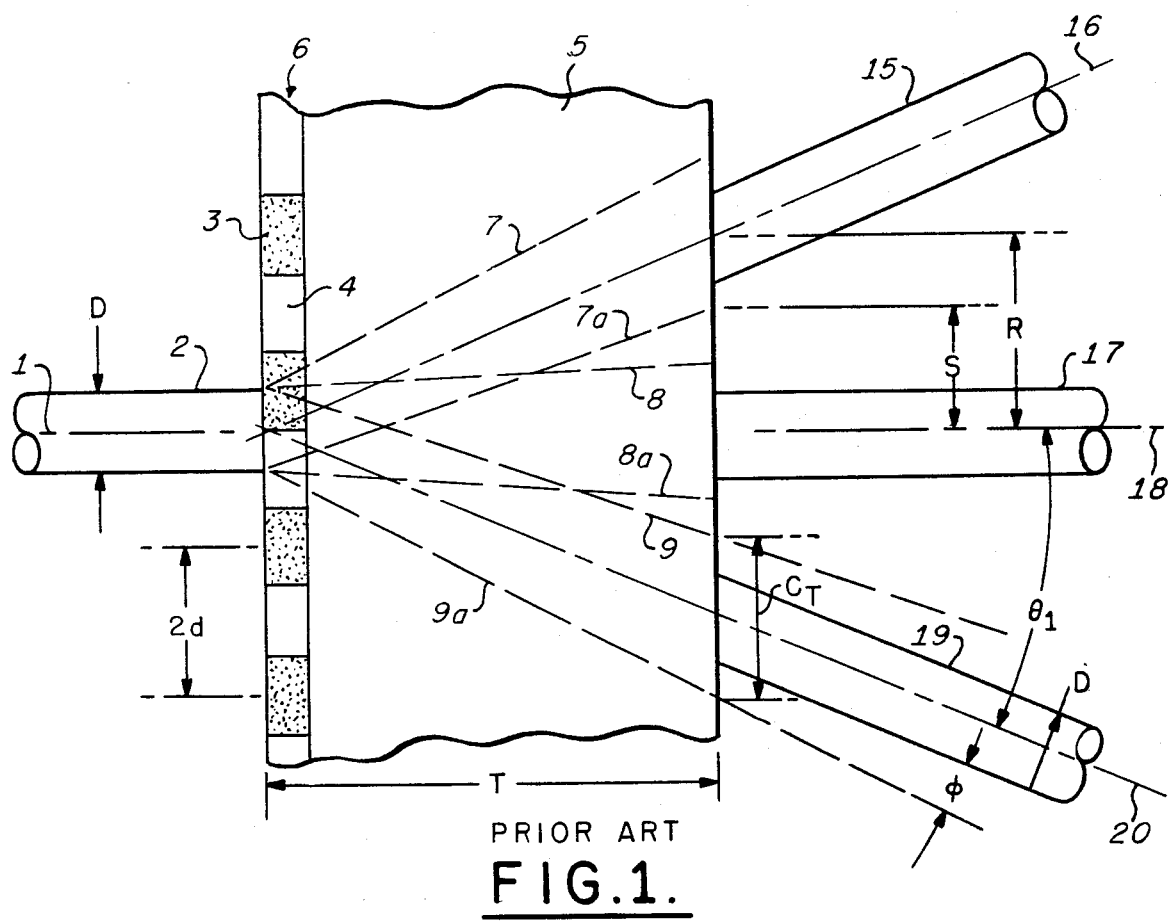
FIG. 1 is a side view of a prior art magnetooptic switch illustrating the use of a magnetic field-induced domain structure for forming a diffraction grating.

For providing an understanding of the structure and operation of the invention and to make clear its advantages over the prior art, it will be convenient first to describe in some detail related features as found, for instance, in the aforementioned Sauter et al patents. Referring to FIG. 1, an essential aspect of the prior art and of the present invention is a normally transparent magnetooptically sensitive thin film 6 disposed upon a transparent substrate 5. When subjected to a magnetic field component lying in the plane of film 6, it demonstrates the formation of the well known stripe domain characteristics found in such films, producing a regular array of alternating stripes 3 and 4 of clockwise and counter-clockwise Faraday rotation in the form of a regular optical grating, the parallel stripes having equal center-to-center displacements d. A second material may be used for substrate 5, the magnetooptically active material of layer 6 being epitaxially disposed upon a first surface thereof in the conventional manner. While a variety of magnetooptically active materials is available for the purpose, one suitable optically active material is a substituted rare earth iron garnet of the formula $Bi_x\text{-}Yb_{3-x}Fe_5O_{12}$, where x falls in the range of 0.7 to 1.2, for example. The stripe domains thus generated form a phase grating generally analogous in action to the action of the conventional fixed optical phase grating, but instead permitting an incident light beam to be variably deflected by an electrically controlled amount and in an electrically controlled direction. For example, light propagating in the multimode fiber optic wave guide 2 of FIG. 1 may be caused by a magnetic field in the plane of film 6 to be first-order deflected through Faraday rotation along an axis 16 or 20 or along any of plural axes (not shown) extending above or below the plane FIG. 1, as described by Sauter et al.

Thus, in the far-field region, the light energy propagating in fiber wave guide 2 is provided with certain forbidden paths and also with preferred paths at particular angles $\theta_N$ given by the equation:

$$\sin \theta_N = N\lambda/2d \quad (1)$$

where N, the order of the permitted path, is an odd integer including zero. The stripe domain spacing d, and therefore the angle $\theta_N$ of diffraction, is readily changed by applying a magnetic field component within layer 6 parallel to the long dimension of the stripes. Further, the entire stripe domain pattern is readily rotated about the axis 1, 18 that lies normal to the plane of film 6 by rotating the magnetic field about that axis 1, 18. Accordingly, the prior art, as well as the present invention, provides an optical device for controllably diffracting a light beam incident at 90° on the surface of an optically active film 6 and for rotating the stripe domains within film 6, thereby steering the selected diffracted light beam to the axis of a selected one of a plurality of output fiber wave guides coupled to the side of substrate 5 opposite film 6.

Still with respect to the prior art and to FIG. 1, it is seen that light flowing in input guide 2, butt sealed at right angles to the face of film 6, is permitted to flow in the absence of a magnetic field in film 6 directly across substrate 5 into the central butt-sealed output guide 17. Guides 2, 17 both lie on axis 1, 18 and are oppositely sealed perpendicular to the parallel sides of the device. Symmetrically disposed, angularly cut fiber guides 15, 19 with respective axes 16, 20 are supplied at equal angles $\theta_1$ with respect to axis 1, 18. Preferably, all fiber optic guides have equal core diameters D, including guides not shown in FIG. 1 that may be found lying in planes other than the plane of the drawing. The liquid-phase epitaxy film 6 is preferably formed on an epitaxially compatible, but magnetic field insensitive transparent substrate 5 composed of gadolinium gallium garnet, though other materials may be used. Films 5 and 6 may have a total thickness T and may be respectively 5 millimeters and 4 microns thick, for example. The plurality of output guides 15, 19, et cetera, lies in a conical pattern symmetrically about axis 1, 18. In FIG. 1, the angle of Diffraction $\theta_1$ is typically 15°.

As illustrated in FIG. 1, the zero order output beam flowing along output axis 18 is coupled to output fiber guide 17, while the several first order light beams are coupled, for example, to output fiber guides 15, 19 along axes 16, 20. The output optical fibers 15, 19 are aligned on the first order optical axes for maximum output efficiency. Grating 6 is so disposed that $\theta_1$ is sufficiently large as to tend to preclude overlapping of the zero and first order diffracted beams. Also, the diffracted light beams do undergo some dispersion when passing through substrate 5, forming expanding cones of light such as fall substantially within the respective boundaries 7, 7a and 9, 9a, which fact further controls the optimum value of angle $\theta_1$ by requiring an appropriate choice of the angular spacing between boundaries 8a and 9, for example, to preclude excessive interplay between adjacent zero and first order or between first and second order diffracted light beams. Note that each beam, while within substrate 5, expands from an area related to the diameter D of input fiber guide 2 and the numerical aperture of guide 2 to an area related to the major axis dimension $C_T$ where the beam intercepts the opposite surface of substrate 5. Thus, the axes of the output fiber guides 15, 19, et cetera, are preferably equally spaced in the FIG. 1 device along a particular ellipse on the exposed surface of substrate 5 and having a radius of major axis R whose center lies on the primary axis 1, 18.

Figure 3:
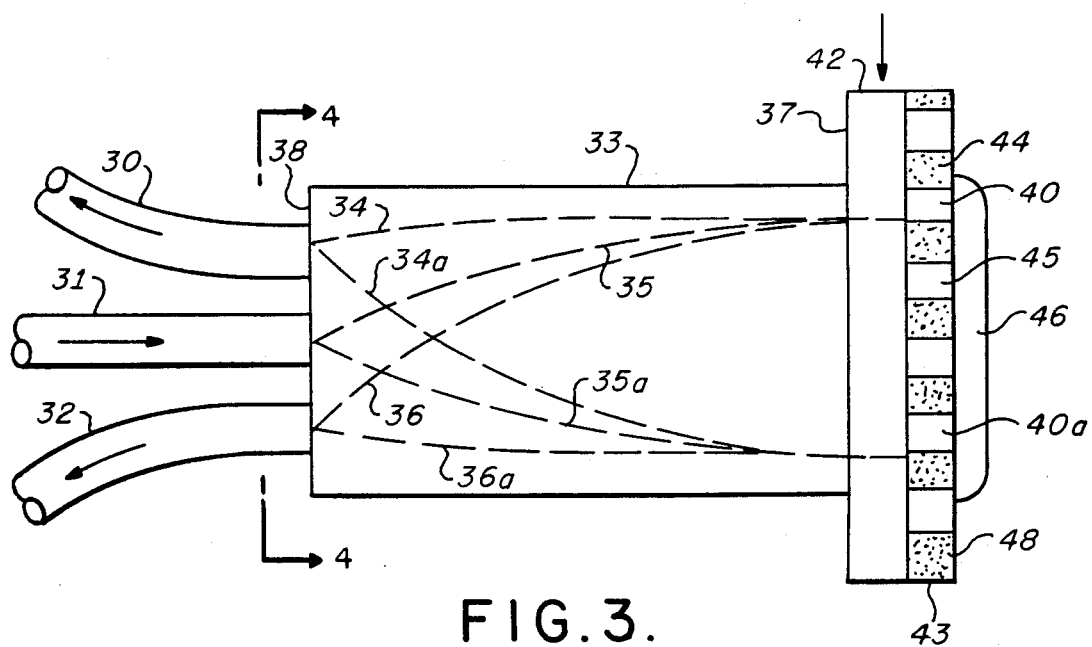
FIG. 3 is a side view of one embodiment of the invention in partial cross-section wherein reflection is employed.
Figure 8:
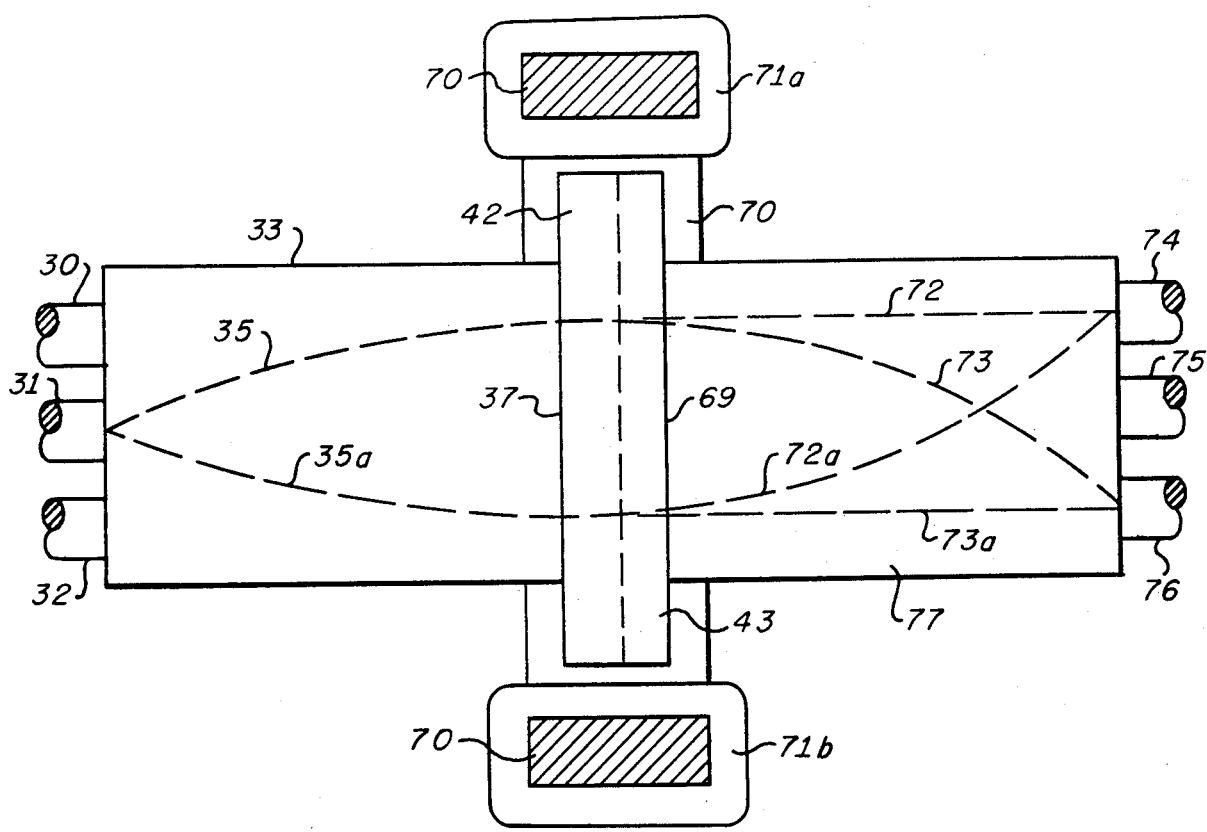
FIG. 8 is a side view of a second embodiment of the invention in cross-section wherein bilateral light flow is achieved.

The present invention, as shown in principle forms in FIGS. 3 and 8, is designed further to improve the basic Sauter et al concept, additionally reducing the optical insertion loss inherent in the Sauter et al device and consistently reducing potential optical cross-talk between the zero and first order beams of the Sauter et al device, while at the same time permitting construction of a more compact configuration. Further, the new devices are achieved without using angularly cut fiber wave guides, since only fibers butt sealed in the usual manner at 90° to their axes are required. Though small numerical aperture and small core fibers may be used in the new devices as in Sauter et al, large core, large numerical aperture cores are preferably and advantageously employed.

Returning to FIG. 1, loss and cross-talk readily arise in the sauter et al devices and seriously limit the scope of design choices that may be exercised. The major losses stem from spreading losses over and above those brought about in the first order diffraction process. In FIG. 1, it is seen that the first order beam between boundaries 9, 9a is determined at the active film 6 by the diameter D of guide 2 and its numerical aperture. But, as directed along axis 20 toward output fiber guide 19, the beam significantly expands to an area related to the major axis dimension $C_T$ at the opposite surface of substrate 5. Thus, a major portion of the first order diffracted light beam does not intercept output guide 19 but may be scattered. The fraction tf transmitted into output guide 19 is roughly proportional to the area of the abutted end of guide 2 to the total area of the light cone at the input end of guide 19, or to $D^2/C_T^2$. Here:

$$C_T = D + \frac{2R}{\cos \theta_1} \tan \phi \quad (2)$$

But:

$$\tan \phi \approx \frac{N.A.}{n_s} \quad (3)$$

where N.A. is the fiber numerical aperture and $n_s$ is the substrate refractive index, so that the transmitted fraction tf becomes:

$$tf = \frac{D^2}{\left[D + \frac{2R}{\cos \theta_1}\left(\frac{N.A.}{n_s}\right)\right]^2} \quad (4)$$

and so that the excess loss $L_E$ in dB. is:

$$L_E = -10 \log \frac{D^2}{\left[D + \frac{2R}{\cos \theta_1}\left(\frac{N.A.}{n_s}\right)\right]^2} \quad (5)$$

Figure 2:
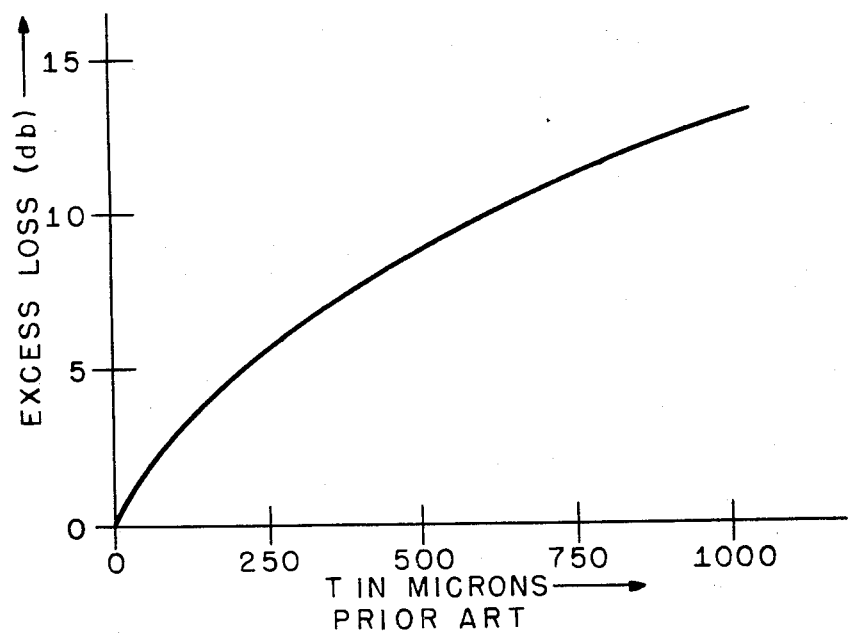
FIG. 2 is a graph useful in explaining the advantages of the present invention.

It will be of interest to note that excess loss is defined as the optical insertion loss of the device that is present in addition to the insertion loss of an ideal switch for which the substrate thickness T is zero. Consider, by way of typical example, a FIG. 1 device constructed of a readily available low cost, graded index, wide band fiber guide with D=63 microns, N.A.=0.21, $\theta_1=15°$, and $n_s=2.0$. FIG. 2 illustrates the excess loss $L_E$ as a function of substrate film thickness T. It is seen that $L_E$ is 9 to 11 dB. for normally acceptable thickness values T of 20 to 30 mils.

Further, it will be seen from FIG. 1 that any overlap between the portion of the light cone 8, 8a actually entering zero order guide 17 and the portion of the light cone 7, 7a or 9, 9a actually entering first order guide 16 or 20 may cause serious cross-talk problems, as does any scattered light.

Figure 4:
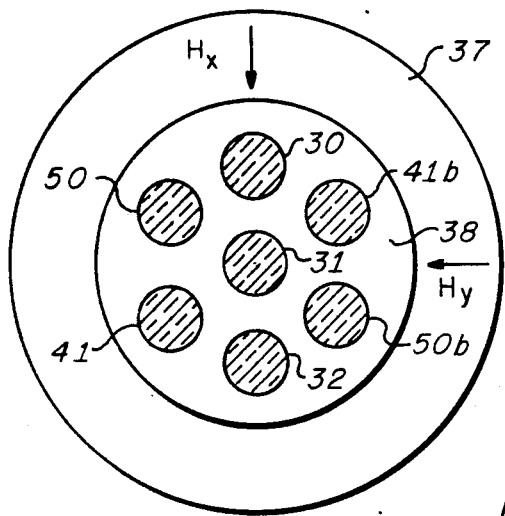
FIGS. 4 and 5 are end views of two forms of the FIG. 3 device taken along the line 4—4 of FIG. 3.

The impact of restrictive problems found in compact forms of the prior art is substantially reduced in the embodiment of the invention shown in FIGS. 3 and 4. The novel device employs an input fiber optic guide 31 butt sealed in the usual manner at right angles to a first face 38 of a lens device 33. Symmetrically placed with respect to input guide 31 is a pair of output fiber optic guides 30, 32, also butt-sealed at right angles to face 38. The input role of guide 31 may readily be interchanged with the output roles of guides 30, 32.

A essential feature of the device is a circular cylindrical or rod lens 33 which acts both as a collimating and decollimating lens in accord with the sense of flow of light through the lens. Preferably, the function of lens 33 is performed by a small glass rod achromatic lens with a parabolic radial distribution of refractive index increasing with respect to its optical axis and with a very short focal length whereby a real image may be formed at one end surface of the lens. Such achromatic lenses for collimating or decollimating purposes, particularly designed for use with optical fiber light guides, are widely described in the literature, including the R. A. Soref U.S. patent application Ser. No. 13,095, filed Feb. 21, 1979, entitled "Liquid Crystal Switching Matrices", and assigned to Sperry Corporation and the U.S. Pat. No. 3,894,789 to Kobayashi et al. The selected lens preferably has three features for use in the present invention: the lens length is a fourth of the wave guide pitch at the center operating wave length so as to image the fiber core source at infinity, the lens numerical aperture is greater than the core numerical aperture, and the lens outside diameter exceeds the fiber cladding diameter. Also of interest are the arrangements of the Holzman U.S. Pat. No. 4,119,362 and of the paper "Microlenses for Coupling Junction Lasers to Optical Fibers", *Applied Optics,* January 1974, page 89 et seq. by L. G. Cohen et al. Other conventional devices may be employed. Suitable devices may be purchased under the trade name Selfoc from the Nippon Sheet Glass Company, 3 New England Executive Park, Burlington, Mass. A typical lens 33 is a 2 mm. diameter, wide angle Selfoc SLW lens with a numerical aperture of 0.50. The lens is 0.25 pitch at the optical communication wave length of interest, such as 0.85 microns, although it may be slightly less than 0.25 in pitch to compensate for the thickness of gadolinium gallium garnet substrate 42.

At interface 37, there is affixed a magnetic field insensitive substrate 42 similar to substrate 5 of FIG. 1. Reflections at interface 37 are avoided by using a transparent adhesive of conventional nature in the form of an optical index matching cement. An epitaxially formed magnetooptically active film 43 similar to film 6 of FIG. 1 is formed on substrate 42 opposite face 37. On its surface 48, there is deposited a highly reflective mirror 46 in the form of a gold or other such metal layer or of a multilayer dielectric mirror assembly.

Light incoming within fiber guide 31 is collimated into a parallel ray beam upon arrival at the reflecting interface 48, where it is reflected back within its same input boundaries 35, 35a and is focussed back into input fiber 31 in the absence of a field $H_x$. In the presence of a magnetic field $H_x$, polarized as indicated in FIG. 1, the collimated beam, upon arriving at the reflecting interface 48, is deflected by the grating of layer 43 downward by −1 first order diffraction, flowing within boundaries 36, 36a and entering output fiber guide 32 as a decollimated or focussed light beam and, at the same time, by +1 first order diffraction, an equal amount of light is deflected upward whereby it is focussed by the lens into the core of fiber guide 30. Thus, incoming light within guide 31 makes a double pass through the substrate 42, through active film 43, back through active film 43, and finally through substrate 42 into lens 33. If deflected in the presence of a finite field $H_x$, it passes equally into output fiber guides 30 and 32; that is, the output fibers are addressed in pairs. In this operation, achromatic lens 33 serves the dual purpose of collimating light from input guide 31 and of decollimating or focussing reflected first order light for collection by guides 30 and 32 in the presence of a magnetic field $H_x$. Optical insertion loss and cross-talk are held in this arrangement. By a proper choice of magnetic film thickness, the first order diffracted intensity can be optimized.

Figure 5:
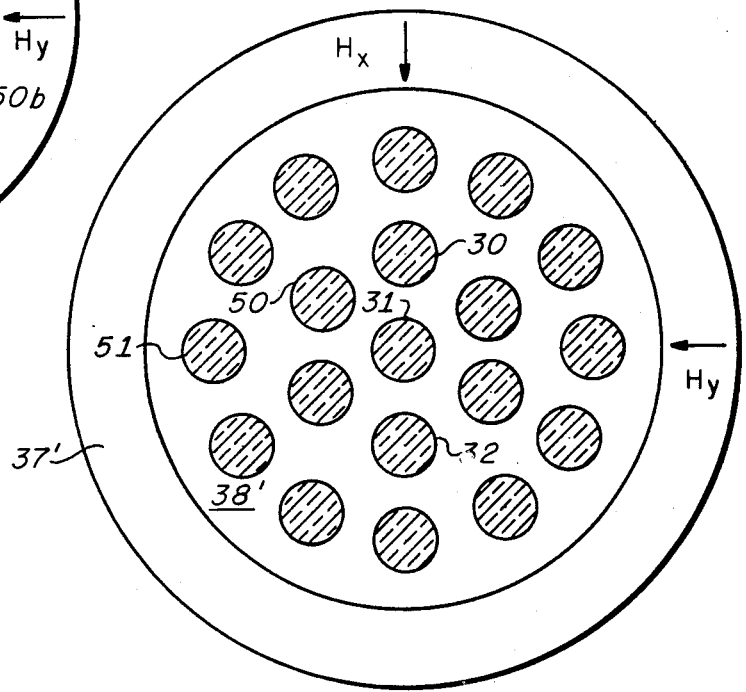

The output fiber guides 30 and 32 of FIG. 3 are shown in the end view of FIG. 4 and are excited according to the orientation and magnitude of the magnetic field $\vec{H}$ where $\vec{H} = \vec{H}_x + \vec{H}_y$. If $H_x$ is set at zero and an appropriate finite horizontal magnetic field $H_y$ is substituted, the grating lines are rotated about the axis of fiber guide 31 by 90°. To switch the incoming light beam, certain components of both $H_x$ and $H_y$ are present, and the input light will be deflected into output guides 50 and 50b, for example. Other combinations or ratios of $H_x$ to $H_y$ will focus the input light beam into selected pairs of the ring of output guides, including output guides 30, 32 or 50, 50b, et cetera, as will be further discussed, thereby accomplishing multi-pole switching. As in FIG. 5, an additional ring or additional rings may be employed, concentric with ring 30, 32, 50, 50b, 41, 41b, et cetera, and excitable by the use of a total magnetic field larger than that used for ring 30, 32 et cetera. By successive variations of the components $H_x$ and $H_y$, the incoming light beam may be selectively focussed on output fiber guide pairs of the outer ring of guide ends 51 et cetera. Thus, the grating array may be rotated continuously or according to any selected program to perform any predetermined order of paired excitations of fiber guide ends in one or either of the two concentric rings on face 38'.

Figure 6:
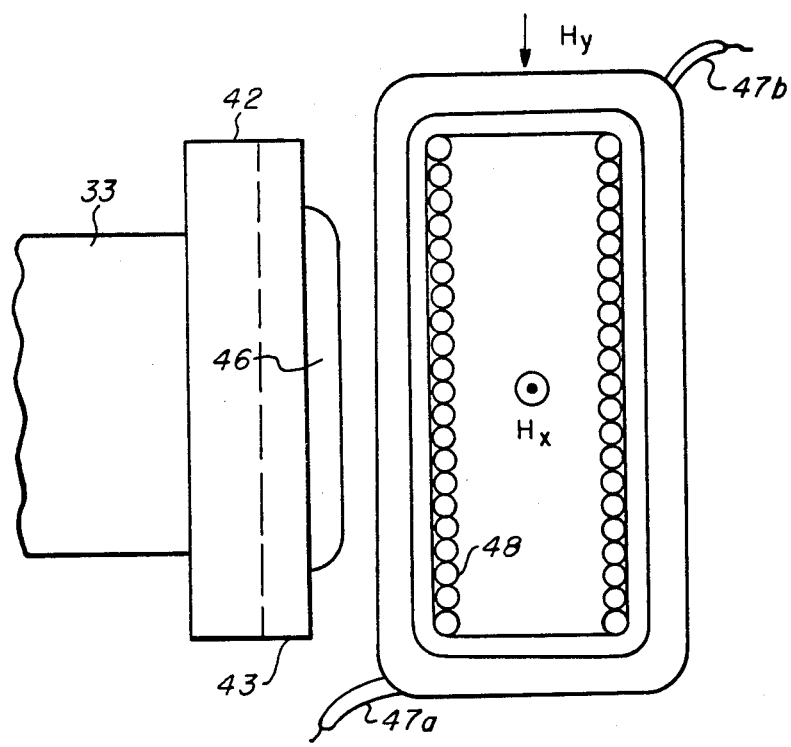
FIGS. 6 and 7 show side views of magnetic field generator systems useful with the device of FIGS. 3, 4 and 5.

While the controllable $H_x$ and $H_y$ magnetic fields may be generated by cooperating pairs of cylindrical coils disposed like Helmholz coils, the embodiment is preferably supplied with coil arrangements permitting the apparatus to be constructed in even more compact fashion than in the aforementioned Torok et al U.S. Pat. No. 3,752,563, as in FIGS. 6 and 7. In FIG. 6, the $H_y$ coil 48 consists of a multi-turn generally rectangular coil disposed symmetrically at the outer face of mirror 46, its axis and field $H_y$ intercepting the axis of lens 33 perpendicular thereto. Nested about coil 48 is a second similar multi-turn coil 47, its leads being indicated at 47a, 47b. The axis of coil 47 is coincident with the field $H_x$ direction and intercepts the axis of lens 33 at 90°. The fringing $H_x$ and $H_y$ components are arranged to thread through the active layer 43.

Figure 7:
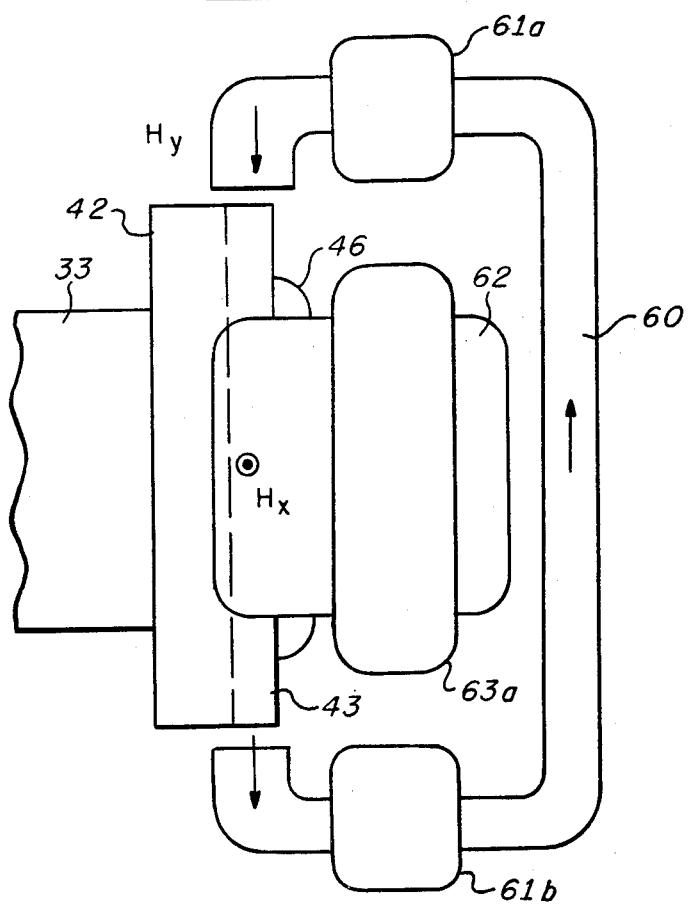

In FIG. 7, the $H_y$ field is generated by controlled current flow through coils 61a, 61b inducing lines of flux flowing through the C-shaped ferrite yoke 60 which leap across small air gaps at opposed sides of the magnetooptically active film 43. The field $H_x$ oriented perpendicular to field $H_y$ is similarly generated using a yoke 62 like yoke 60 and the coil pair 63a, 63b disposed at right angles to yoke 60. It will be evident to those skilled in the art that the magnetic field generation structure may readily be affixed to a support common to the apparatus of FIG. 3.

In the embodiment of the invention seen in FIG. 8, a versatile light transmission switch is shown not employing reflection, but otherwise employing the principles of the reflection switch of FIG. 3. Portions of the FIG. 8 switch to the left of interface 69 are the same as those of FIG. 3 and bear similar reference numerals, including fiber optic guides 30, 31, 32, lens 33, substrate 42 affixed at interface 37 to one end of lens 33, and the magnetooptical film 43.

Mirror 46 of FIG. 3 is no longer used, being replaced by an achromatic rod lens 77 which is a substantial duplicate of achromatic lens 33 and which is affixed to interface 69 by a transparent, optically matching adhesive in the usual manner. The end of the circular cylindrical lens 77 opposite interface 69 is supplied with three butt sealed fiber optic guides 74, 75, 76 respectively aligned with guides 30, 31, 32. While other electromagnetic systems may be used, the embodiment will be discussed, in part, as if in operation with a magnetic field system like that of the aforementioned Torok et al U.S. Pat. No. 3,752,563 involving a generally circular yoke 70 excited by a first cooperating pair of coils 71a, 71b and second space quadrature-disposed coils that are not seen in the figure. It is understood that the magnetic field within the magnetooptically active film 43 is again a vectorial combination of $H_x$ and $H_y$ magnetic fields.

In operation, light entering fiber guide 31 in FIG. 8 is collimated by achromatic lens 33 so that it flows between boundaries 35, 35a to form parallel rays at the active layer 43. Depending upon the magnitudes and polarity of the magnetic field injected into layer 43, the input light energy will be focussed and deflected between boundaries 72, 72a and 73, 73a into output fiber guides 74 and 76. By adjustment of the magnetic field, the first order light is deflected to other fiber guide pairs in the concentric output array, giving multi-pole, transmissive optical switching. Reciprocally, the light beam entering fiber guide 74 may be deflected partly into guide 31; a beam entering fiber guide 76 may similarly be injected into guide 31.

In FIG. 8, only a limited number of fiber guides is shown, but the number of output fibers can be greatly increased, as desired. As in FIGS. 4 and 5, several concentric circles of fiber guides may be employed in the device of FIG. 8. Again, addressing inner and outer circles of fiber guides may be accomplished by changing the x and y current magnitudes to change the magnitude of H as well as its angular orientation. It will be understood that full duplex transmission may readily be accomplished through the switch of FIG. 8 with simultaneous upstream and downstream data flow and data multiplexing.

Figure 9:
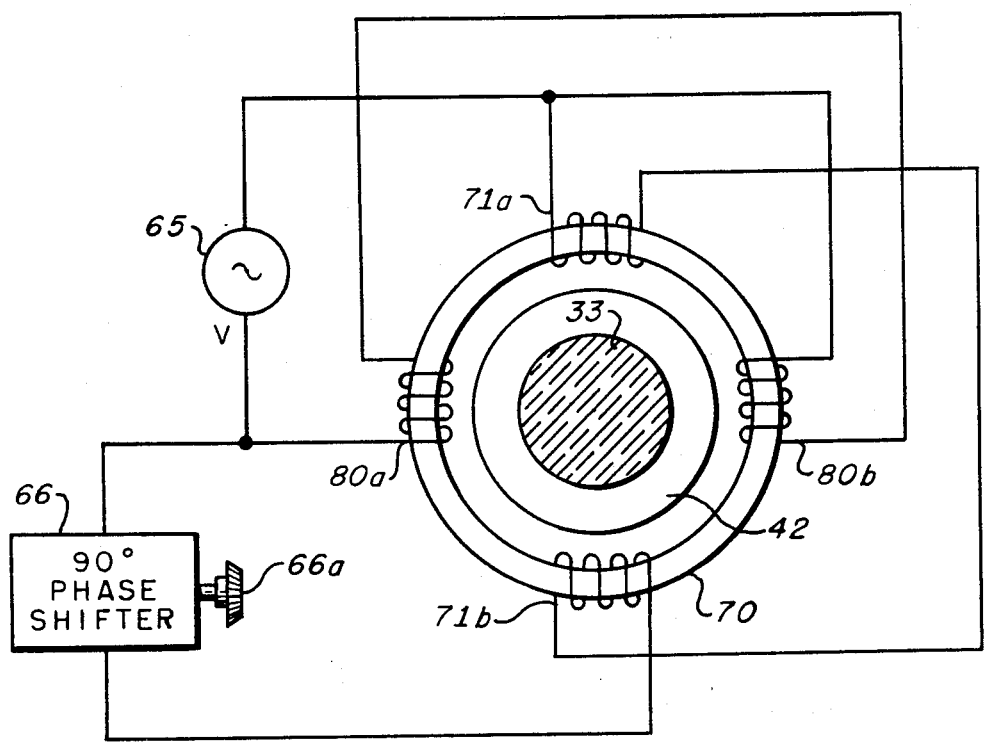
FIGS. 9, 10, and 11 are side views of further forms of magnetic field generator systems.

The optical switch of the present invention is also particularly adaptable for the regular continuous sampling of incoming light signals, as in FIG. 9, for time division multiplexing. Here, the ferrite core 70 surrounding the active layer at lens 33 has four paired coils 71a, 71b and 80a, 80b spaced at 90° intervals. By adjusting the relative phases of the currents in the coils using the control 66a of phase shifter 66, the in-plane magnetic field in the active layer may be oriented at any desired angle. Continuous field direction rotation may also be readily achieved. It will be understood that the field control arrangements of FIGS. 8 and 9 may also readily be applied to the reflective switch of FIG. 3.

Figure 10:
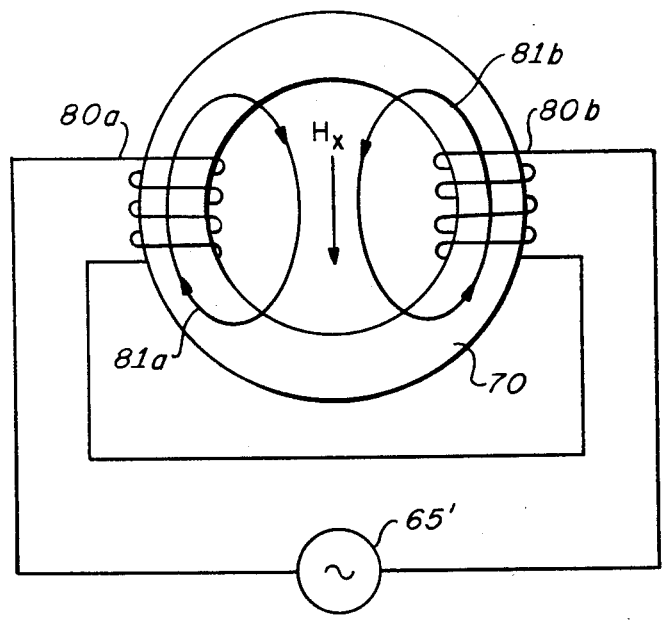
Figure 11:
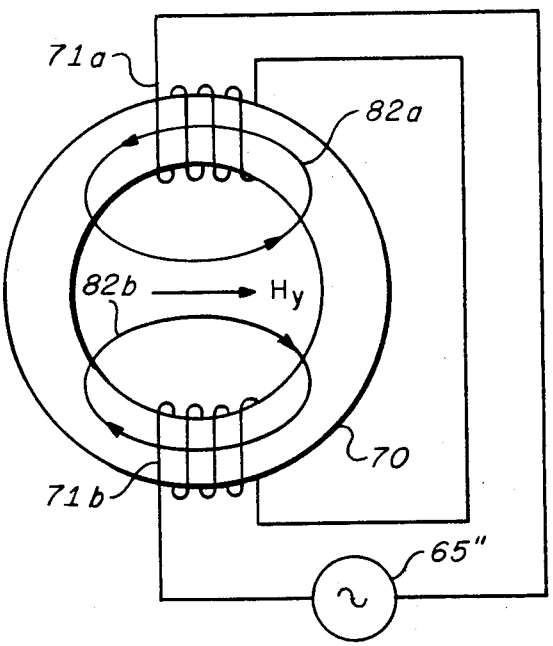

FIGS. 10 and 11 provide further understanding of the apparatus of FIG. 9, as they consider the operation of the x and y coil pairs separately. In FIG. 10, the flux of coil 80a opposes that of its partner coil 80b, so that flux must leave the ferrite core 70 and pass into the central region through the magnetooptically active layer. In a similar manner, the y field flux is driven into the same central region; in FIG. 11, the flux of coil 71a opposes that of its partner coil 71b, so that the magnetic flux must again leave the ferrite core 70 and also pass into the central region through the magnetooptically active layer. In the combined structure of FIG. 9, the total field in the active layer is simply the vector sum of the component fields $H_x$ and $H_y$ of FIGS. 10 and 11. In addition to excitation by alternating or pulsed currents, it is apparent that stepped rotation of the control field may be had by adjusting direct current magnitudes.

While the reflective and transmissive embodiments of the respective FIGS. 3 and 8 have many common advantages over the prior art, the reflective device of FIG. 3 has certain added advantages. First, it is easier to arrange for optimum diffraction. It is difficult to grow thick magnetooptically active films; since film 43 of FIG. 3 is used twice in the reflection process, it needs be only half as thick as film 43 of FIG. 8. Also, since the domain width is typically the same as the width of the magnetooptically active film, the diffraction angles for the reflective device are inherently twice those of the transmission device. Additionally, reflective embodiments of the invention permit achievement of larger diffraction angles than the transmissive embodiments and are more easy to mate with compact magnetic field generation structures.

It is seen that the invention is a significant improvement in the art of magnetooptical switches as applied in optical communication systems for switching, multiplexing, and demultiplexing light beams and in performing such functions in optical computers and for random accessing. In general, the present invention provides improved rapid and reliable switching of unpolarized optical signals from one multimode optical fiber guide to any one of a group of similar multimode guides with lower insertion loss, lower cross talk, lower excess loss, and broad band operation. In one form, the invention provides simultaneous switching for both upstream and downstream switching. The reflective form of the invention takes shape in a particularly compact configuration making particularly efficient use of the magnetooptically active film.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. An optical switching device comprising:
   a substrate having substantially parallel first and second planar surfaces,
   planar magnetizable film means having a first surface coupled to said first surface of said substrate and a second surface for generating a plurality of stripe domains therewithin when a magnetic field having components substantially parallel to said first surface of and within said magnetizable film means is applied thereto,
   mirror means coupled to said second surface of said magnetizable film means for reflecting light incident thereto from said magnetizable film means,
   lens means positioned with a first surface thereof coupled to said second surface of said substrate for converting a diverging light beam incident to a second surface of said lens means to a substantially collimated light beam incident to said magnetizable film means,
   said lens means having a circular cylindrical form with an axis substantially perpendicular to said first and second surfaces of said substrate,
   a first optical waveguide coupled to said second surface of said lens means with a cross sectional center thereof substantially on said axis whereby, when said magnetizable film means is not magnetized, light incident to said magnetizable film means-mirror means combination from said first optical waveguide is reflected therefrom and focussed to said first optical waveguide,
   a plurality of optical waveguides coupled to said second surface of said lens means in diametrically positioned pairs whereby, with said magnetizable film means appropriately magnetized, light incident to said magnetizable film means-mirror means combination from said first optical waveguide is reflected therefrom and is substantially focussed to a preselected one of said optical waveguide pairs, and
   means for generating said magnetic field to appropriately magnetize said magnetizable film means for forming said stripe domains such that light incident to said magnetizable film means-mirror means combination from said first optical waveguide is reflected for focussing to said preselected one of said optical waveguide pairs.

2. Apparatus as described in claim 1 wherein said substrate is formed of a transparent magnetic-field-insensitive garnet.

3. Apparatus as described in claim 2 wherein said planar magnetizable film means is formed of a magnetic field sensitive garnet.

4. Apparatus as described in claim 1 wherein said lens means has a parabolic distribution of refractive index radially increasing with respect to its axis of symmetry.

5. Apparatus as described in claim 1 wherein said plurality of optical wave guides are arrayed in circles concentric with said lens axis.

6. Apparatus as described in claim 5 wherein said first and said plurality of optical wave guides comprise optical fibers butt-sealed to said lens means at said second surface with end faces thereof substantially in a plane that is substantially perpendicular to said axis.

7. Apparatus as described in claim 1 wherein: said planar magnetizable film means comprises $Bi_xYb_{3-x}Fe_5O_{12}$, where x falls within the range of 0.7 to 1.2, and said mirror means comprises gold.

8. An optical switching device in accordance with claim 1 wherein said magnetic generator means includes:
   a first coil comprising an electrical conductor multiply turned about said magnetizable film means in a cylindrical form with a longitudinal axis substantially perpendicular to said axis of said lens means,
   a second coil comprising an electrical conductor multiply turned about said magnetizable film means in a cylindrical form with a longitudinal axis substantially perpendicular to said longitudinal axis of said first coil and said axis of said lens means, and
   means for coupling electrical currents to said first and second coils.

9. An optical switching device in accordance with claim 1 wherein said magnetic generator means includes:
   a first C-shaped yoke with an open end, an upper section, a lower section, and an interconnecting section therebetween, said open end having opposing faces substantially perpendicular to an axis therebetween, said axis therebetween being substantially perpendicular to said axis of said lens means,
   first coil means comprising means for conducting electric current multiply turned about said upper and lower sections of said first C-shaped yoke,
   a second C-shaped yoke with an open end, an upper section, a lower section, and an interconnecting section therebetween, said open end having opposing surfaces substantially perpendicular to an axis therebetween, said axis therebetween being substantially perpendicular to said axis of said lens means and said axis between said opposing surfaces of said first C-shaped yoke,
   second coil means comprising means for conducting electric current multiply turned about said upper and lower sections of said second C-shaped yoke, and
   means for coupling electrical currents to said first and second coil means.

10. An optical switching device in accordance with claim 1 wherein said magnetic generator means includes:
   a circular ferrite core surrounding said magnetizable film means,
   a first set of first and second electric current conductors each multiply turned about said ferrite core at diametrically opposite positions, each having first and second leads extending therefrom, said first lead of said first conductor being coupled to said second lead of said diametrically positioned second conductor,
   a second set of first and second electric current conductors each multiply turned around said ferrite core at diametrically opposite positions spaced from said positions of said first set of electrical current conductors by an angle of substantially 90°, each having first and second leads extending therefrom, said first lead of said first conductor being coupled to said second lead of said diametrically positioned second conductor and said second lead of said first conductor being coupled to said second lead of said first conductor of said first set, means coupled between said first lead of said second conductor of said first set and said first lead of said second conductor of said second set for imparting substantially 90° phase shift to electrical currents coupled therethrough, and means for coupling electrical currents between said first lead of said second conductor of said second set and said second lead of said first conductor of said first set.

11. An optical switching device comprising:

planar magnetizable film means having first and second substantially parallel surfaces for generating a plurality of stripe domains therewithin when a magnetic field having components within said magnetizable film means substantially parallel to said first and second surfaces is applied thereto, first lens means positioned with a first surface thereof coupled to said first surface of said magnetizable film means for converting a diverging light beam incident to a second surface thereof to a substantially collimated light beam incident to said magnetizable film means, said first lens means having a circular cylindrical form with an axis substantially perpendicular to said first and second surfaces of said magnetizable film means, second lens means coupled to said second surface of said magnetizable film means at a second surface thereof for focussing collimated light emerging from said magnetizable film means to preselected regions on a first surface thereof, said preselected regions being determined by said applied magnetic field, said second lens means having a circular cylindrical form with an axis substantially perpendicular to said first and second surfaces of said magnetizable film means, a first optical waveguide coupled to said second surface of said first lens means with a cross-sectional center thereof substantially on said axis of said first lens means, and a first plurality of optical waveguides coupled to said first surface of said second lens means at said preselected regions in diametrically positioned pairs.

12. An apparatus as described in claim 11 wherein said first optical waveguide comprises an optical fiber butt sealed to said second surface of said first lens means with an end face thereof substantially in a plane that is substantially perpendicular to said axis of said first lens means and wherein said first plurality of optical waveguides comprise optical fibers butt sealed to said first surface of said second lens means with end faces thereof substantially in a plane that is substantially perpendicular to said axis of said second lens means.

13. An apparatus as described in claim 11 wherein said first plurality of optical waveguides are arrayed in circles substantially concentrically with said lens axis of said second lens means.

14. An apparatus as described in claim 11 wherein said first optical waveguide comprises an optical fiber butt sealed to said second surface of said first lens means with an end face thereof substantially in a plane that is substantially perpendicular to said axis of said first lens means and wherein said first plurality of optical waveguides comprise optical fibers butt sealed to said first surface of said second lens means with end faces thereof substantially in the plane that is substantially perpendicular to said axis of said second lens means.

15. An optical switching device in accordance with claim 11 wherein said first lens means is additionally for focussing collimated light emerging from said magnetizable film means to preselected regions on said second surface thereof, said preselected regions being determined by said applied magnetic field, and said second lens means is additionally for converting a diverging light beam incident to said first surface thereof to a substantially collimated light beam incident to said magnetizable film means and further including:

a second optical waveguide coupled to said first surface of said second lens means with a cross-sectional center thereof substantially on said axis of said second lens means, and a second plurality of optical waveguides coupled to said second surface of said first lens means at said preselected regions thereof in diametrically positioned pairs.

16. An apparatus as described in claim 15 wherein said first and second plurality of optical waveguides are arrayed in circles concentric respectively with said lens axes of said first and second lens means.

17. An apparatus as described in claim 11 or 15 wherein said magnetizable film means is formed of a magnetic field sensitive garnet.

18. An apparatus as described in claim 11 or 15 wherein said first and second lens means have parabolic distributions of refractive index radially increasing from the axes thereof.

19. An apparatus as described in claim 11 or 15 wherein said planar magnetizable film means comprises $Bi_xYb_{3-x}Fe_5O_{12}$, where x falls within the range of 0.7 to 1.2 and said mirror means comprises gold.

20. An optical switching device in accordance with claim 11 or 15 further including a magnetic generator comprising:

a first coil comprising an electrical conductor multiply turned about said magnetizable film means in a cylindrical form with a longitudinal axis substantially parallel to said first and second surfaces of said magnetizable film means, a second coil comprising an electrical conductor multiply turned about said magnetizable film means in a cylindrical form with a longitudinal axis substantially perpendicular to said longitudinal axis of said first coil and substantially parallel to said first and second surfaces of said magnetizable film means, and means for coupling electrical currents to said first and second coils.

21. An optical switching device in accordance with claim 11 or 15 further including a magnetic generator comprising:

a first C-shaped yoke with an open end, an upper section, a lower section, and an interconnecting section therebetween, said open end having opposing faces substantially perpendicular to an axis therebetween, said axis therebetween being substantially parallel to said first and second surfaces of said magnetizable film means, first coil means comprising means for conducting electric current multiply turned about said upper and lower sections of said first C-shaped yoke, a second C-shaped yoke with an open end, an upper section, a lower section, and an interconnecting section therebetween, said open end having opposing surfaces substantially perpendicular to an axis therebetween, said axis therebetween being sustantially parallel to said first and second surfaces of said magnetizable film means and perpendicular to said axis between said opposing surfaces of said first C-shaped yoke, and second coil means comprising means for conducting electric current multiply turned about said upper and lower sections of said second C-shaped yoke, and means for coupling electrical currents to said first and second coil means.

22. An optical switching device in accordance with claim 11 or 15 further including a magnetic generator comprising:

a circular ferrite core surrounding said magnetizable film means, a first set of first and second electric current conductors each multiply turned about said ferrite core at diametrically opposite positions, each having first and second leads extending therefrom, said first lead of said first conductor being coupled to said second lead of said diametrically positioned second conductor, a second set of first and second electric current conductors each multiply turned around said ferrite core at diametrically opposite positions spaced from said positions of said first set of electrical current conductors by an angle of substantially 90°, each having first and second leads extending therefrom, said first lead of said first conductor being coupled to said second lead of said diametrically positioned second conductor and said second lead of said first conductor being coupled to said second lead of said first conductor of said first set, means coupled between said first lead of said second conductor of said first set and said first lead of said second conductor of said second set for imparting substantially 90° phase shift to electrical currents coupled therethrough, and means for coupling electrical currents between said first lead of said second conductor of said second set and said second lead of said first conductor of said first set.

* * * * *